United States Patent
Fulkerson, Jr. et al.

(10) Patent No.: US 7,475,239 B2
(45) Date of Patent: Jan. 6, 2009

(54) PLUGGABLE TRUST ADAPTER ARCHITECTURE, METHOD AND PROGRAM PRODUCT FOR PROCESSING COMMUNICATIONS

(75) Inventors: Carroll Eugene Fulkerson, Jr., Raleigh, NC (US); Anthony Joseph Nadalin, Austin, TX (US); Nataraj Nagaratnam, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/251,502

(22) Filed: Sep. 20, 2002

(65) Prior Publication Data

US 2004/0059931 A1    Mar. 25, 2004

(51) Int. Cl.
*H04L 9/00* (2006.01)
*H04L 9/32* (2006.01)
*G06F 7/04* (2006.01)
*G06F 11/00* (2006.01)

(52) U.S. Cl. .............. 713/151; 726/3; 726/4; 726/5; 726/6; 726/7; 726/28; 726/29; 726/30; 713/152; 713/153; 713/154; 709/220; 709/221; 709/222; 709/223; 709/224

(58) Field of Classification Search ............. 726/3–15, 726/28–30; 713/151–154; 709/220–232
See application file for complete search history.

(56) References Cited

U.S. PATENT DOCUMENTS

| | | | |
|---|---|---|---|
| 5,978,478 A | 11/1999 | Korematsu | |
| 6,085,030 A | 7/2000 | Whitehead et al. | |
| 6,115,376 A | 9/2000 | Sherer et al. | |
| 6,263,445 B1 | 7/2001 | Blumenau | |
| 6,954,792 B2 * | 10/2005 | Kang et al. | 709/229 |
| 2001/0027521 A1 | 10/2001 | Cromer et al. | |

FOREIGN PATENT DOCUMENTS

| | | |
|---|---|---|
| WO | WO 01/01241 A2 | 1/2001 |
| WO | WO 01/90884 A2 | 11/2001 |
| WO | WO 01/91033 A2 * | 11/2001 |

* cited by examiner

*Primary Examiner*—Longbit Chai
(74) *Attorney, Agent, or Firm*—A. Bruce Clay; Hoffman Warnick LLC

(57) ABSTRACT

A pluggable trust adapter architecture that accommodates a plurality of interceptors is provided. Each interceptor is adapted to perform security processing of communications having a specific protocol. Specifically, when a communication is received, it will be routed from a channel router to a specific interceptor based on the protocol of the communication. The interceptor will then "security" process the communication (e.g., extract data, perform verification, etc.). Once the interceptor has processed the communication, the extracted data and the communication itself will be passed to an authorization system for authorization.

27 Claims, 3 Drawing Sheets

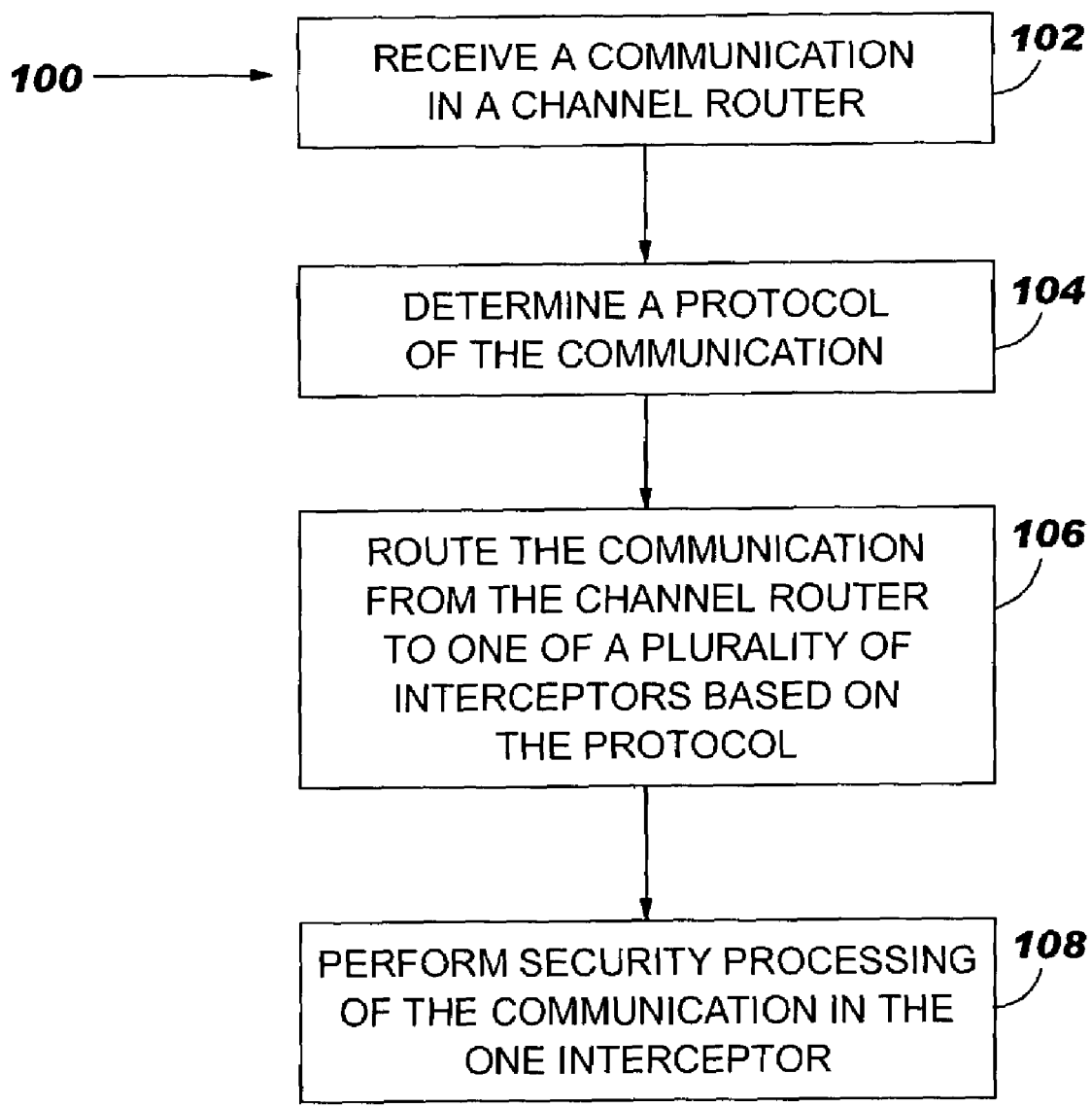

PLUGGABLE TRUST ADAPTER ARCHITECTURE, METHOD AND PROGRAM PRODUCT FOR PROCESSING COMMUNICATIONS

BACKGROUND OF THE INVENTION

1. Field of the Invention

The present invention generally relates to a pluggable trust adapter architecture, method and program product for processing communications. Specifically, the present invention allows communications received by an application server in a variety of protocols to be efficiently processed for verification, authentication and/or authorization.

2. Background Art

As electronic business becomes more prevalent, new transports, protocols and messaging mechanisms are continuously being introduced. For example, in a Java 2, Platform, Enterprise Edition (J2EE), Hypertext Transfer Protocol (HTTP) and Internet Inter-ORB protocol (IIOP) are expanded to allow for Java Message Service (JMS). Currently, services such as Web Services allow publication, discovery and use of such varied services hosted on heterogeneous systems. In these environments, however, each target server will have to process requests that arrive over any of these protocols or transports.

When requests are received on a target server, it is common for security processing to be performed. That is, incoming communications should be validated, authenticated and authorized before full access to the target server and its corresponding network is granted. This security processing helps prevent the target server and network from being the subject of attacks and/or unauthorized access by intruders. To this extent, most of the existing protocols and transports have the built-in capability to carry authentication information of the requester chain. When communications are received, target servers generally perform authentication based on the underlying security mechanisms using standard interfaces such as Java Authentication and Authorization Services (JAAS). Unfortunately, to accommodate the transports and protocols that are based on proprietary mechanisms, the target servers need to be constantly updated.

Heretofore, attempts have been made to address the problems associated with varying protocols. Typically, such attempts required a programmer to hard code the target server with the capability to receive and process communications in various protocols. Such a requirement, however, is both time consuming and costly. Moreover, there is no efficient way for the communications to be processed. That is, the communications are not routed to an appropriate processing "destination" based on their protocols.

In view of the foregoing, there exists a need for a pluggable trust adapter architecture, method and program product for processing communications. Specifically, a need exists for a solution that allows communications in varying protocols to be "security" processed in an efficient manner. A further need exists for a pluggable trust adapter architecture that includes trust adapters, each of which are capable of security processing a communication having a specific protocol. Still yet, a need exists for a channel router that can route a communication to an appropriate interceptor based on the communication's protocol. An additional need exists for the pluggable trust adapter architecture and the channel router to be provided in an application server such as a J2EE application server.

SUMMARY OF THE INVENTION

In general, the present invention provides a pluggable trust adapter architecture, method and program product for processing communications. Specifically, under the present invention, Internet-based communications are received by a channel router. Based on the protocol thereof, each communication is routed to a specific, protocol dependent interceptor within a pluggable trust adapter architecture. Upon receipt, the interceptors will perform security processing of the communications. Typically, the security processing includes data extraction (e.g., user name, group information, etc.), verification, and/or authentication. Once extracted, the data can be passed to an authorization system that determines whether the communication is authorized.

According to a first aspect of the present invention, a pluggable trust adapter architecture for processing communications is provided. The pluggable trust adapter architecture comprises: (1) a first interceptor for receiving a first communication in a first protocol from a channel router, wherein the first interceptor performs security processing of the first communication; and (2) a second interceptor for receiving a second communication in a second protocol from the channel router, wherein the second interceptor performs security processing of the second communication.

According to a second aspect of the present invention, a pluggable trust adapter architecture for processing communications is provided. The pluggable trust adapter architecture comprises: (1) a plurality of interceptors for receiving the communications from a channel router based on protocols of the communications, and for performing security processing of the communications.

According to a third aspect of the present invention, a method for processing a communication is provided. The method comprises: (1) receiving the communication in one of a plurality of interceptors within a pluggable trust adapter architecture, wherein the communication is sent to the one interceptor from a channel router based on a protocol of the communication, and wherein each of the plurality of interceptors are adapted to process communications having a specific protocol; and (2) processing the communication in the one interceptor.

According to a fourth aspect of the present invention, a program product stored on a recordable medium for processing communications is provided. When executed, the program product comprises: (1) a first interceptor module for receiving a first communication in a first protocol from a channel router, wherein the first module performs security processing of the first communication; and (2) a second interceptor module for receiving a second communication in a second protocol from the channel router, wherein the second module performs security processing of the second communication.

Therefore, the present invention provides a pluggable trust adapter architecture, method and program product for processing communications.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram, according to the present invention.

Figure 1:
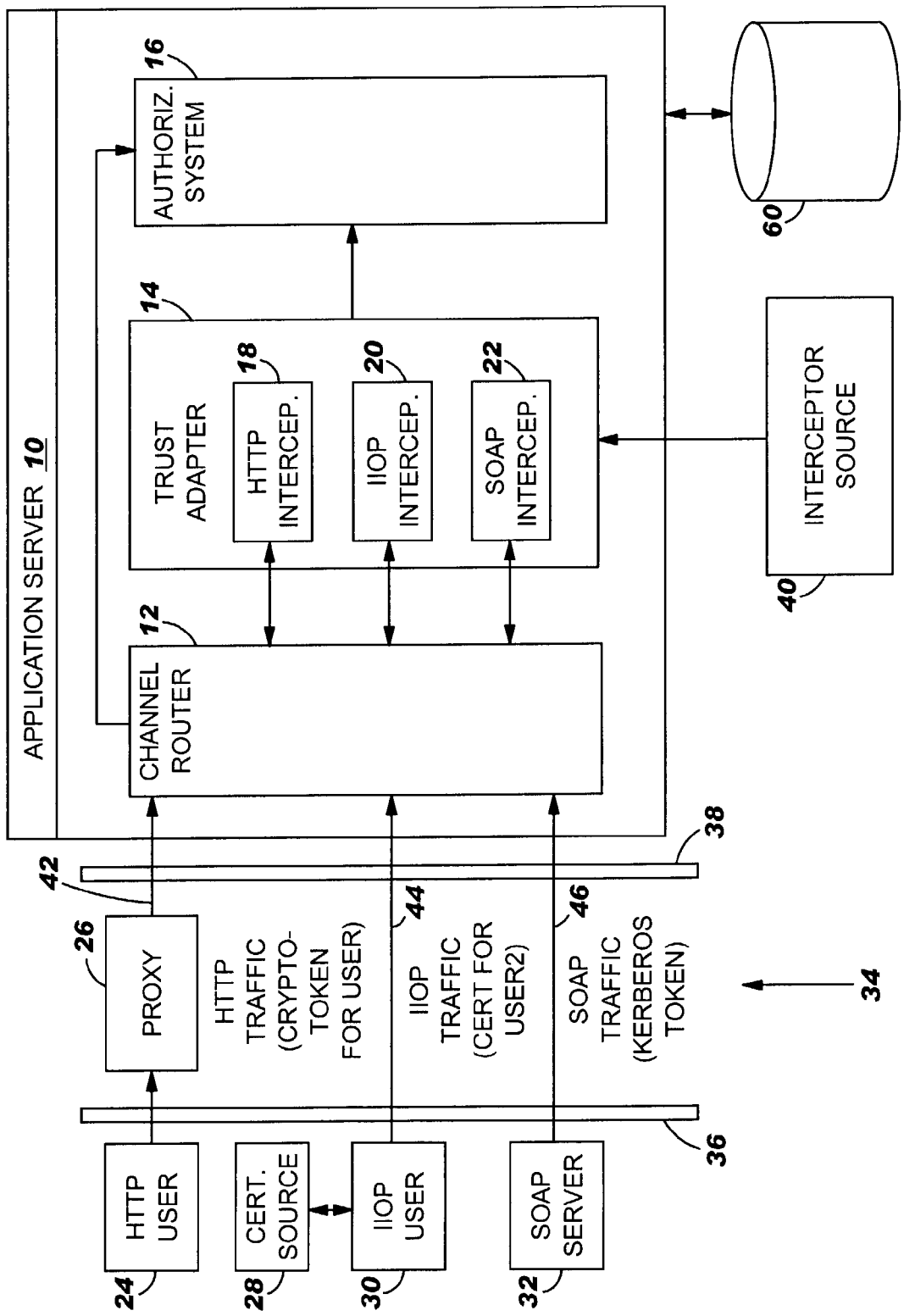
FIG. 1 depicts an architectural diagram of an application server including a pluggable trust adapter architecture, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a pluggable trust adapter architecture, method and program product for processing communications. Specifically, under the present invention, Internet-based communications are received by a channel router. Based on the protocol thereof, each communication is routed to a specific, protocol-dependent interceptor within a pluggable trust adapter architecture. Upon receipt, the interceptors will perform security processing of the communications. Typically, the security processing includes data extraction (e.g., user name, group information, etc.), verification, and/or authentication. Once extracted, the data can be passed to an authorization system that determines whether the communication is authorized.

Referring now to FIG. 1, a typical embodiment of the present invention is shown. As depicted, application server 10 generally includes channel router 12, pluggable trust adapter architecture 14 having interceptors (interceptor modules) 18, 20 and 22, and authorization system 16 (authorization engine). In general, application server 10 is part of a network (not shown) that users/servers 24, 30 and 32 are attempting to access. As indicated above, network security is a major concern in today's computing world. Accordingly, before a user is granted access to a network, security processing such as verification, authentication and authorization must be performed.

Under the present invention, channel router 12 and pluggable trust adapter architecture 14 provide an efficient way to security process an incoming communication. To this extent, each interceptor 18, 20, 22 is adapted to process communications having a specific protocol. For example, HTTP interceptor 18 is adapted to perform security processing (e.g., data extraction, verification, etc.) of communication 42 in HTTP protocol, IIOP interceptor 20 is adapted to process communication 44 in IIOP protocol, while SOAP interceptor 22 is adapted to process communication 46 in SOAP protocol. By providing a pluggable trust adapter architecture 14 as described herein, new or changing protocols can be easily accommodated. Specifically, if the IIOP protocol changes, interceptor source 40 can provide an updated IIOP interceptor 20. Similarly, if a new "XYZ" protocol is developed, an "XYZ" interceptor can be inserted into trust adapter architecture 14. To this extent, trust adapter architecture 14 is pluggable because, in part, interceptors can be dynamically updated and/or inserted. That is, there is no need to "power down" or remove trust adapter architecture 14 itself from application server 10 to update or insert interceptors.

It should be understood in advance that the protocols of HTTP, IIOP and SOAP are shown herein for illustrative purposes only, and are not intended to be limiting. Specifically, it should be appreciated that the teachings of the present invention could be implemented to process a communication in any protocol. It should also be understood that although application server 10 is typically a Java 2 Platform, Enterprise Edition (J2EE) server, any type of application server could be implemented hereunder.

As known in the art, HTTP (Hypertext Transfer Protocol) is the set of rules for exchanging files (text, graphic images, sound, video, and other multimedia files) on the World Wide Web. As such, HTTP user 24 (e.g., web user) can communicate with application server 10 directly or via proxy 26 located between firewalls 36 and 28 (known in the art as a demilitarized zone "DMZ"). In either event, communication 42 will be received by channel router 12. Based on the protocol being HTTP, channel router 12 will route communication 42 to HTTP interceptor 18. Upon receipt, HTTP interceptor 18 will extract data from communication 42 (e.g., user name, group information, etc.) and perform any necessary verification. Once extracted, the data will be mapped and passed to authorization system 16 as a "Subject" object (e.g., a JAVA class). Authorization system 16 will then analyze communication 42 and the mapped user identity to determine whether communication 42 is "authorized." As known in the art, authorization is the process of deciding whether access should be granted to HTTP user 24. For example, if HTTP user 24 was attempting to access a particular directory within the network, authorization system 16 would determine (e.g., by accessing database 60) whether HTTP user 24 had such "permission." It should be understood that in authorizing communication 42, authorization system 16 could receive communication 42 and the extracted data from channel router 12, or from trust adapter architecture 14. It should also be understood, that other "security" components could be included in application server 10. For example, application server 10 could include an authentication system (not shown), which would determine whether HTTP user 24 is who it has identified itself to be. Alternatively, authentication could be performed by trust adapter architecture 14, or directly by the target system prior to authorization 16. As further shown in FIG. 1, application server 10 can also process communication 44 in the IIOP (Internet Inter-ORB Protocol). As known in the art, IIOP is a protocol that makes it possible for distributed programs written in different programming languages to communicate over the Internet. IIOP is an important part of a strategic industry standard, the Common Object Request Broker Architecture (CORBA). For example, using CORBA's IIOP and related protocols, a company can write programs that will be able to communicate with their own or other company's existing or future programs wherever they are located and without having to understand anything about the program other than its service and a name. As depicted, IIOP user 30 can obtain a certificate from certificate source 28 and transmit communication 44 that includes the certification to application server 10. Similar to HTTP communication 42, channel router 12 will route communication 44 based on its protocol. Thus, communication 44 will be routed to IIOP interceptor 20. Upon receipt, IIOP interceptor will extract data and perform verification. The data and communication 44 will be then passed to authorization system 16 (e.g., from trust adapter architecture 14 or channel router 12) for authorization. For example, authorization system could determine whether IIOP user 30 can access "AccountBean getBalance( )."

Communication 46 in Simple Object Access Protocol (SOAP) is processed similarly. As known in the art, SOAP is a way for a program running in one kind of operating system (e.g., Windows) to communicate with a program in the same or another kind of an operating system (e.g., Linux) by using the World Wide Web's HTTP and its Extensible Markup Language (XML) as the mechanisms for information exchange. To this extent, SOAP typically fosters business to business (B2B) or server to server communications. When SOAP server 32 issues communication 46, channel router 12 will route communication 46 to SOAP interceptor 22, which will extract data and perform verification. Once complete, the extracted data and communication 46 will be passed to authorization system 16 (e.g., from trust adapter architecture 14 or channel router 12), which will determine whether communication 46 is authorized. For example, authorization system 16 could determine whether SOAP server 32 of XYZ, Inc. can access "AccountService."

Figure 2:
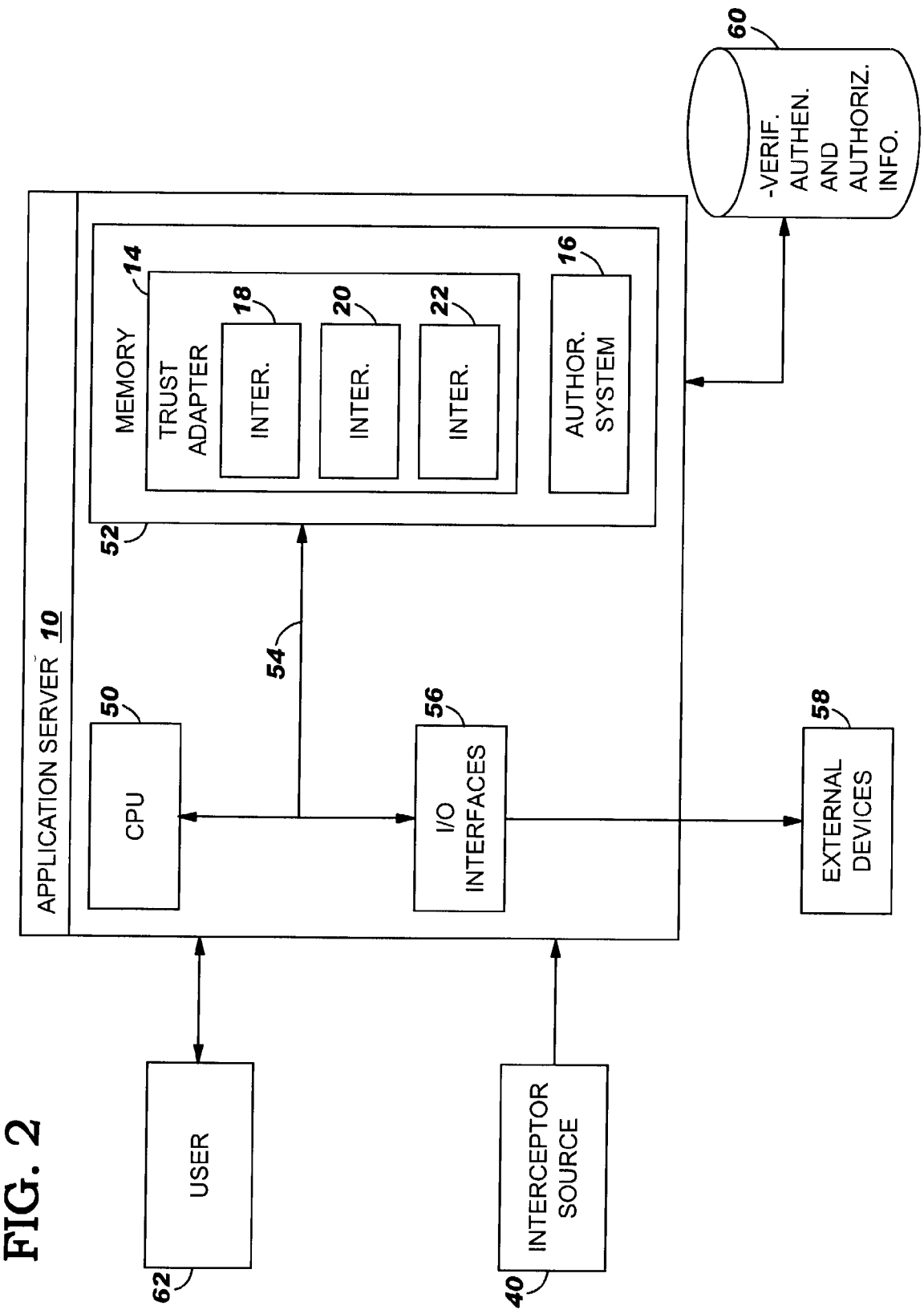
FIG. 2 depicts the application server of FIG. 1 in greater detail.

Referring now to FIG. 2, a more detailed diagram of application server 10 is shown. As depicted, application server 10 generally includes central processing unit (CPU) 50, memory 52, bus 54, input/output (I/O) interfaces 56, external devices/resources 58 and database 60. CPU 50 may comprise a single processing unit, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, similar to CPU 50, memory 52 may reside at a single physical location, comprising one or more types of data storage, or be distributed across a plurality of physical systems in various forms.

I/O interfaces 56 may comprise any system for exchanging information to/from an external source. External devices/resources 58 may comprise any known type of external device, including speakers, a CRT, LED screen, hand-held device, keyboard, mouse, voice recognition system, speech output system, printer, monitor, facsimile, pager, etc. Bus 54 provides a communication link between each of the components in application server 10 and likewise may comprise any known type of transmission link, including electrical, optical, wireless, etc. In addition, although not shown, additional components, such as channel router 12, cache memory, communication systems, system software, etc., may be incorporated into application server 10.

It should be understood that communication between user 62 (intended to represent any user or server issuing communications), interceptor source 40 and application server 10 can occur via a direct hardwired connection (e.g., serial port), or via an addressable connection (e.g., the Internet, a LAN, a WAN, a VPN, or other network).

Shown in memory 52 of application server 10 is pluggable trust adapter architecture 14 and authorization system 16. In a typical embodiment, interceptor modules 18, 20 and 22 and authorization system 16 are based on Java Authentication and Authorization Services (JAAS) technology. However, it should be understood that other technologies could be utilized. For example, an HTTP interceptor module could be implemented similar to a servlet filter. In any event, as described above, trust adapter architecture 14 includes interceptors (interceptor modules) 18, 20 and 22 which are each adapted to perform security processing of communications having a specific protocol. For example, interceptor module 18 could process communications in HTTP protocol, while interceptor module 20 could process communications in IIOP protocol, and interceptor module 22 could process communications in SOAP protocol. Typically, the security processing performed by interceptor modules 18, 20 and 22 includes data extraction and verification (and optionally authentication).

Once an interceptor module has "security" processed a communication, the extracted data and the communication are passed to authorization system 16 for authorization. Under the present invention, verification, authentication and/or authorization can be accomplished by accessing information in database 60. For example, a password could be authenticated by accessing database 60 to determine whether a password submitted by user 62 is valid. To this extent, database 60 may include one or more storage devices, such as a magnetic disk drive or an optical disk drive. In another embodiment, database 60 includes data distributed across, for example, a local area network (LAN), wide area network (WAN) or a storage area network (SAN) (not shown). Database 60 may also be configured in such a way that one of ordinary skill in the art may interpret it to include one or more storage devices.

In addition, as indicated above, trust adapter architecture 14 is pluggable because interceptor modules can be dynamically updated and/or inserted (e.g., by interceptor source) and because any third party security product vendor can provide an interceptor and handle the security aspects (not necessarily only the server vendor). For example, interceptor source 40 could be a software vendor who has changed the protocol in which communications are sent from his/her software program. In this event, the vendor could dynamically update the applicable interceptor (or dynamically submit an updated interceptor) within trust adapter architecture 14.

Referring now to FIG. 3, a method flow diagram 100 is shown. First step 102 is receive a communication in a channel router. Second step 104 is to determine a protocol of the communication. Third step 106 is to route the communication from the channel router to one of a plurality of interceptors based on the protocol. Fourth step 108 is to perform security processing of the communication in the one interceptor.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls application server 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A pluggable trust adapter architecture system for processing communications, comprising:
   a first interceptor for receiving a first communication in a first protocol from a channel router, wherein the first interceptor performs security authentication processing of the first communication;
   a second interceptor, located on a same system as the first interceptor, for receiving a second communication in a second protocol from the channel router, wherein the second interceptor performs security authentication processing of the second communication, wherein said second protocol and said first protocol have distinct identification of protocol types;
   wherein the channel router is to route the received communication to one of a plurality of interceptors based on the identification of protocol types; and
   wherein the first interceptor and the second interceptor are designed to perform security authentication processing of the first communication and the second communication, the first interceptor and second interceptor being accessible to the trust adapter architecture concurrently.

2. The pluggable trust adapter architecture of claim 1, wherein the channel router routes the first communication and the second communication based on an identification of a first protocol type associated with the first protocol and a second protocol type associated with the second protocol.

3. The pluggable trust adapter of claim 1, wherein the first interceptor and second interceptor are dynamically updateable.

4. The pluggable trust adapter architecture of claim 1, wherein a third interceptor capable of security processing of a third communication in a third protocol received from the channel router can be dynamically inserted into the pluggable trust adapter architecture.

5. The pluggable trust adapter architecture of claim 1, wherein the channel router and the pluggable trust adapter architecture are part of an application server.

6. The pluggable trust adapter architecture of claim 5, wherein the application server is a Java 2 Platform, Enterprise Edition (J2EE) server.

7. The pluggable trust adapter architecture of claim 5, wherein the application server further comprises an authorization system.

8. The pluggable trust adapter architecture of claim 7, wherein the authorization system is a Java Authentication and Authorization Services (JAAS) based system.

9. The trust adapter architecture of claim 1, wherein the security processing of the first communication and the second communication comprises data extraction and verification.

10. A method for processing a communication, comprising:
    receiving the communication in one of the plurality of interceptors located on the same system within a pluggable trust adapter architecture, wherein the communication is sent to the one interceptor from a channel router based on an identification of communication protocol types, and wherein each of the plurality of interceptors are adapted to process security authentication on communications having a specific protocol type;
    wherein a channel router is to route the received communication to one of the plurality of interceptors based on the identification of protocol types; and
    wherein each one of the plurality of interceptors is designed to perform security authentication processing concurrently on the received communication based on the distinct identification of protocol types.

11. The method of claim 10, wherein the processing step comprises;
    extracting data from the communication; and
    verifying the communication.

12. The method of claim 10, wherein the receiving step comprises:
    receiving the communication in a channel router;
    determining a protocol of the communication; and
    routing the communication from the channel router to one of a plurality of interceptors based on an identification of a protocol type associated with the protocol.

13. The method of claim 10, further comprising dynamically updating the plurality of interceptors.

14. The method of claim 10, wherein the channel router and the pluggable trust adapter architecture are part of an application server.

15. The method of claim 14, wherein the application server is a Java 2 Platform, Enterprise Edition (J2EE) server.

16. The method of claim 14, wherein the application server further comprises an authorization system.

17. The method of claim 16, wherein the authorization system is a Java Authentication and Authorization Services (JAAS) based system.

18. A program product stored on a recordable medium for processing communications, which when executed, acts on:
    a first interceptor module for receiving a first communication in a first protocol from a channel router, wherein the first module performs security authentication processing of the first communication;
    a second interceptor module, located on a same system as the first interceptor, for receiving a second communication in a second protocol from the channel router, wherein the second module performs security authentication processing of the second communication, wherein said second protocol and said first protocol have distinct identification of protocol types;
    wherein the channel router is to route the received communication to one of a plurality of interceptors based on the identification of protocol types; and
    wherein the first interceptor module and the second interceptor module are designed to perform security authentication processing of the first communication and the second communication, the first interceptor and second interceptor being accessible to a trust adapter architecture concurrently.

19. The program product of claim 18, wherein the channel router routes the first communication and the second communication based on an identification of a first protocol type associated with the first protocol and a second protocol type associated with the second protocol.

20. The program product of claim 18, wherein the security processing of the first communication and the second communication comprises data extraction and verification.

21. The program product of claim 18, wherein the first interceptor module and second interceptor module are dynamically updateable.

22. The program product of claim 18, wherein a third interceptor module capable of security processing of a third communication in a third protocol received from the channel router can be dynamically inserted into the program product.

23. The program product of claim 18, wherein the first interceptor module and the second interceptor module comprise a pluggable trust adapter architecture.

24. The program product of claim 23, wherein the channel router and the pluggable trust adapter architecture are part of an application server.

25. The program product of claim 24, wherein the application server is a Java 2 Platform, Enterprise Edition (J2EE) server.

26. The program product of claim 24, wherein the application server further comprises an authorization system.

27. The program product of claim 26, wherein the authorization system is a Java Authentication and Authorization Services (JAAS) based system.

* * * * *